US006289566B1

(12) United States Patent
Beggs

(10) Patent No.: US 6,289,566 B1
(45) Date of Patent: Sep. 18, 2001

(54) WORKPIECE INSERTION TOOL WITH ANGULAR COMPLIANCE

(75) Inventor: Orrin P. Beggs, Belvidere, IL (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/504,667

(22) Filed: Feb. 15, 2000

(51) Int. Cl.[7] .................................................... B23D 19/02

(52) U.S. Cl. ......................... 29/251; 269/48.1; 29/898.08

(58) Field of Search ............................. 29/251, 280, 282, 29/263, 252; 81/177.85; 279/2.01, 23.1, 906, 2.22; 269/48.1

(56) References Cited

U.S. PATENT DOCUMENTS

| | | | | |
|---|---|---|---|---|
| Re. 36,009 | * | 12/1998 | Shultz | 29/898.08 |
| 1,135,983 | | 4/1915 | Bartlett | 29/251 |
| 1,496,451 | | 6/1924 | Canfield et al. | 29/263 |
| 2,513,412 | * | 7/1950 | Holsing | 279/2 |
| 3,792,856 | * | 2/1974 | Hernandez | 269/48.1 |
| 4,882,829 | | 11/1989 | Dawe | 29/251 |
| 4,907,333 | | 3/1990 | Dawe | 29/251 |
| 5,539,968 | * | 7/1996 | Meyer | 29/251 |
| 6,152,165 | * | 11/2000 | Fukuda | 137/315.41 |

* cited by examiner

*Primary Examiner*—Joseph J. Hail, III
*Assistant Examiner*—Daniel Shanley
(74) *Attorney, Agent, or Firm*—Reising, Ethington, Barnes, Kisselle, Learman & McCulloch, P.C.

(57) ABSTRACT

A workpiece holder for a press tool has a mounting ring which carries a circular retainer ring for frictionally engaging the inside of the workpiece and has a non-planar or curved end face engaged with a complimentary shaped end face of a body of the pressing tool to permit relative angular movement between the mounting ring and pressing tool body. This permits the axis of the mounting ring and hence, the axis of the workpiece carried by the mounting ring, to be angularly inclined relative to the axis of the pressing tool body to permit substantially coaxial insertion of the workpiece into a bore of a body even when the axis of the pressing tool body is angularly offset or skewed relative to the axis of the bore.

13 Claims, 2 Drawing Sheets

WORKPIECE INSERTION TOOL WITH ANGULAR COMPLIANCE

FIELD OF THE INVENTION

This invention relates generally to the installation by press fitting of valve seats, cup plugs bushings and the like into a receiving body and more particularly to an apparatus which facilitates installing such workpieces.

BACKGROUND OF THE INVENTION

Various forms of workpiece holders have been in use for holding hollow workpieces for press fitting. For example, permanent magnets or electromagnets within a press tool have been used to hold metallic workpieces. However, the use of magnets inherently attracts metal chips, metal shavings and other fine metal particles to the press tool. This affects the press tool's ability to properly and accurately locate and press a workpiece. Some workpieces, such as valve seats, cup plugs and the like require a high degree of accuracy when pressed into a bore of a body to ensure that the workpieces are accurately located and firmly positioned within the body.

Other types of workpiece holders include spring loaded fingers built into the nose of a press tool. The main drawback to this type of workpiece holder is that it limits the size of the workpiece to be held because space is needed for the spring fingers, springs, pivots and other various pieces of the assembly. Split collet type tools have also been used to hold a hollow workpiece being pressed. However, these tools are fragile because the inside diameter of the collet has to be thin enough to flex and yet be made of hardened steel for wear.

Another non-magnetic workpiece holder is disclosed in U.S. Pat. No. 5,539,968. The press tool of the '968 patent uses a split ring to engage the inside surface of the workpiece which when received on the tool has a generally flat face received and seated on a flat face of the press tool. By compressing or shifting the split ring, the workpiece may shift laterally relative to the press tool with its axis remaining substantially parallel to the axis of the press tool. This limited lateral shifting of the workpiece facilitates pressing the workpiece into a bore which has an axis parallel to but slightly offset from the axis of the press tool so that the press tool and bore do not have to be perfectly coaxially aligned with each other. However, the engagement of the flat face of the workpiece and flat face of the press tool does not permit the workpiece to become tilted or shifted angularly relative to the press tool and thereby requires the axis of the press tool to be parallel to the axis of the bore for proper insertion of the workpiece into the bore.

SUMMARY OF THE INVENTION

A workpiece holder for a press tool has a mounting ring which carries a circular retainer clip for frictionally engaging the inside of the workpiece and has a non-planar or inclined end face engaged with a complimentary shaped end face of the pressing tool to permit relative angular movement between the mounting ring and pressing tool. This permits the axis of the mounting ring and hence, the axis of the workpiece carried by the mounting ring, to be angularly varied relative to the axis of the pressing tool to permit substantially coaxial insertion of the workpiece into a bore of a body even when the axis of the pressing tool is angularly offset or skewed relative to the axis of the bore.

Objects, features and advantages of this invention are to provide a workpiece holder for a press tool that can hold workpieces of varying composition and size, permits a press tool to be angularly offset relative to the bore, prevents damage to the workpiece and the bore, prevents the press tool from binding or jamming with the bore, assures an accurate and complete insertion of the workpiece into the bore, is simple, rugged, durable, reliable, of relative simple design and economical manufacture and assembly, and has a long, useful in-service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
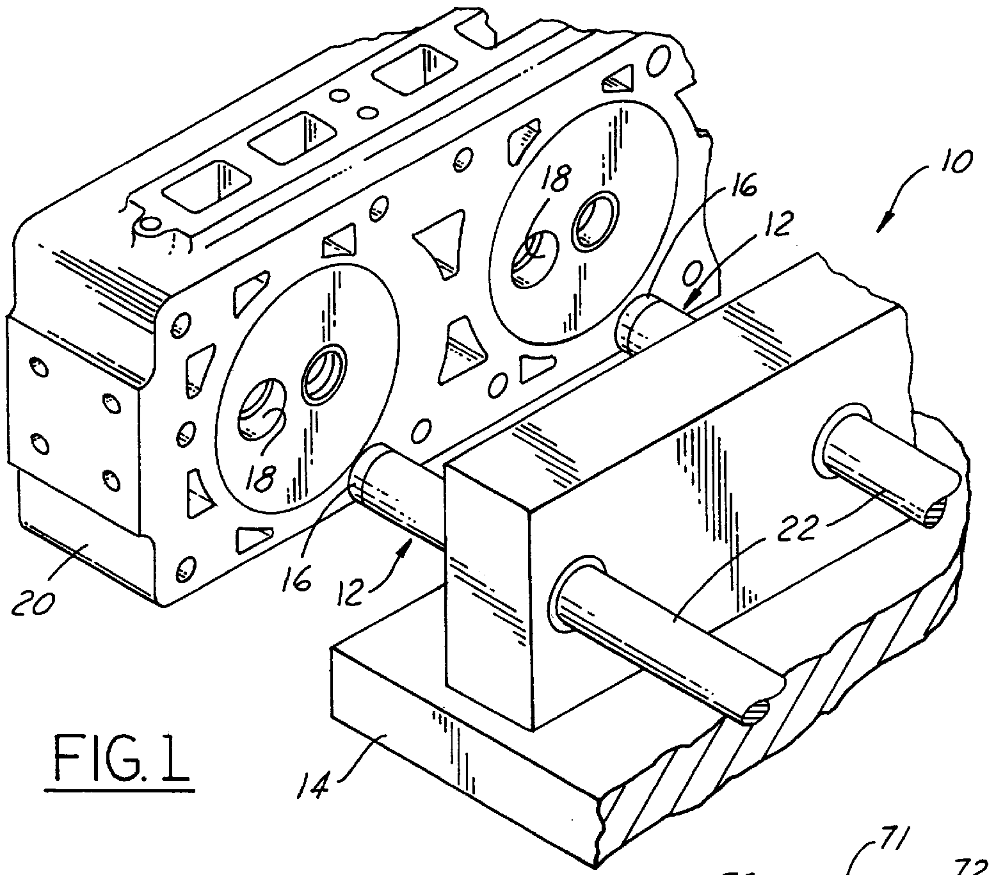
FIG. 1 is a perspective view of a press tool having a plurality of workpiece holders embodying the present invention for inserting valve seats into an engine cylinder head.

Referring in more detail to the drawings, FIG. 1 illustrates a press 10 with a plurality of press tools 12 reciprocally mounted in a base support 14. Each press tool 12 holds a hollow or annular workpiece 16 such as a valve seat. cup plug or the like. The press tools 12 are reciprocated by a drive (not shown) to press with an interference fit each workpiece 16 into a bore 18 of a body 20 such as a cylinder head of an internal combustion engine.

Figure 2:
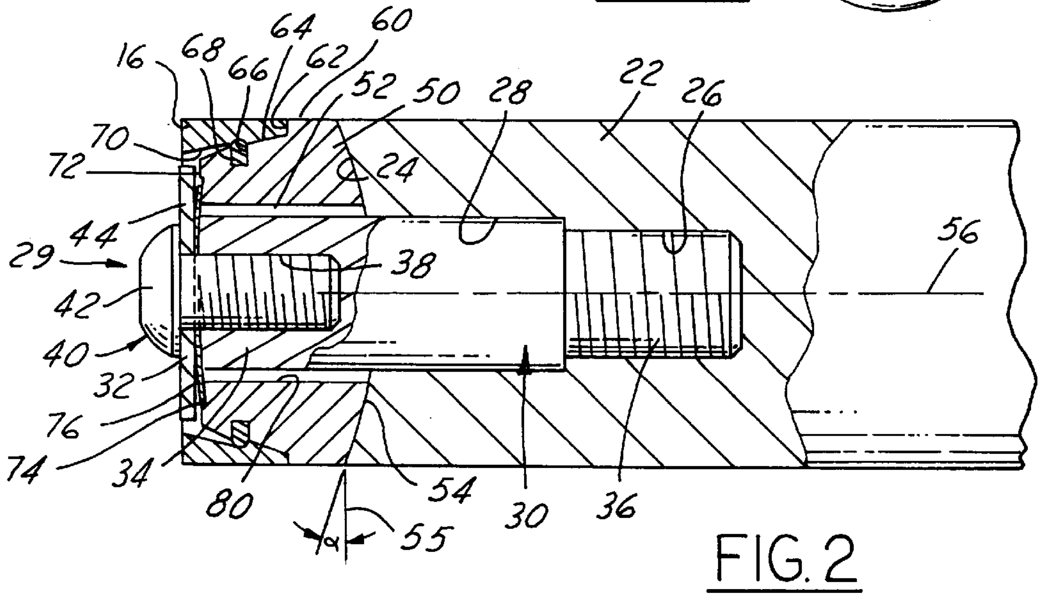
FIG. 2 is an enlarged sectional view of a press tool.

As shown in FIG. 2, each press tool 12 has an elongated body 22 made preferably from hardened steel with a generally annular, non-planer and preferably concave end face 24, which is preferably semi-spherical or conical, a threaded blind bore 26 and a counter bore 28. A retainer assembly 29 comprises a generally cylindrical shank 30, a washer 44 and a cap screw 40. The shank 30 has an end face 32, an enlarged diameter portion 34 closely received in the counter bore 28 and a threaded end 36 received in the threaded blind bore 26. The shank 30 has a threaded blind bore 38 which receives a threaded fastener such as a cap screw 40 having an enlarged head 42 which retains a washer 44 between the head 42 and end face 32 of the shank 30. To permit rocking, canting or tilting of the washer 44 relative to the shank 30 either the washer 44 or the end face 32 of the shank 30 is non-planar, and preferably generally curved. Desirably, a corrugated or so-called "wave washer" may be used to facilitate the relative movement between the washer 44 and shank 30. The washer 44 has an outer radius greater than the shank 30 and is constructed to overlie and thereby retain a mounting ring 50 received around the shank 30 and on the end face 24 of the press tool 12.

The mounting ring 50 is preferably generally annular with a generally cylindrical through bore 52 slightly larger than the outer diameter of the shank 30 to permit relative movement between them. An end face 54 of the mounting ring 50 is generally annular, non-planer, semi-spherical preferably convex and complimentary to the inclined and preferably generally concave end face 24 of the press tool 12. Desirably, the complimentary inclined end faces 24, 54 of the press tool 12 and mounting ring 50 are inclined at an acute included angle $\alpha$ of between 5 and 30 degrees and preferably at about 17 degrees relative to a plane 55 perpendicular to the axis 56 of the press tool 12.

Figure 4:
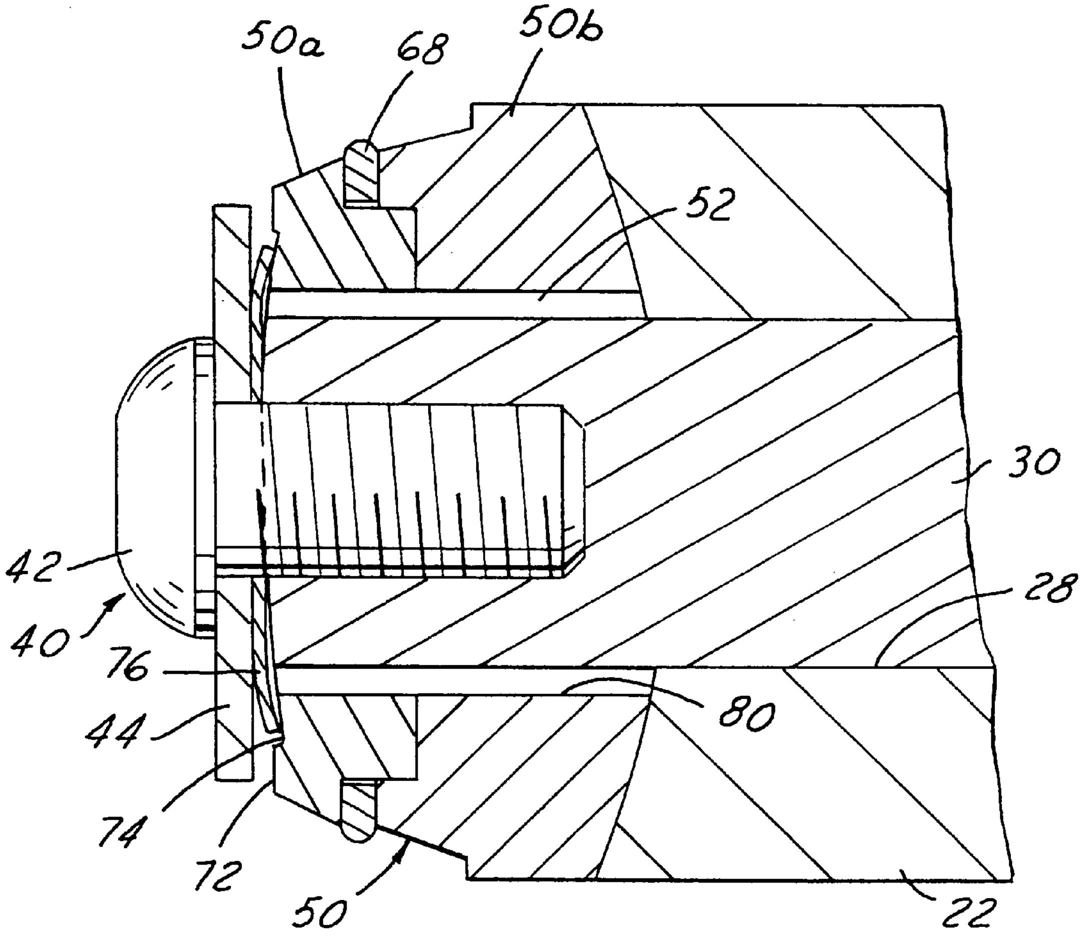
FIG. 4 is an enlarged sectional view of an end of the press tool.

A slight gap between an upper face 72 of the mounting ring 50 and the washer 44 permits relative movement between them. To yieldably bias the mounting ring 50 to a position centered on the press tool 12, as shown in FIGS. 2 and 4, the upper face 72 of the mounting ring 50 has a generally annular recess 74 in which the periphery of a wave or spring washer 76 or other biasing member may be received which yieldably resists the canting or tilting of the mounting ring 50 relative to the press tool 12.

Figure 3:
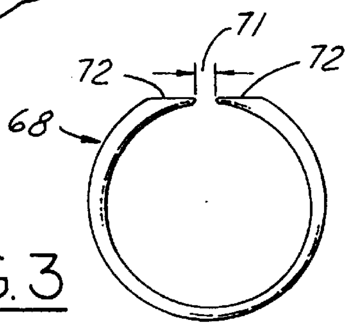
FIG. 3 is an enlarged end view of a circular clip of the press tool.

An outer surface of the mounting ring preferably has a first. generally cylindrical portion 60 and a step or shoulder 62 leading to a second inclined or generally radially inwardly tapered portion 64 with a circumferential slot 66 therein constructed to receive a split retaining ring 68 therein. The tapered second section 64 facilitates holding workpieces 16 having a tapered inner surface. To retain a workpiece 16 on the mounting ring 50, the split retaining ring 68 preferably extends generally radially outwardly from the slot 66 to frinctionally engage the inner surface 70 of a workpiece 16. As shown in FIG. 3, the retaining ring is generally annular with a split or gap 71 which permits the retaining ring 68 to be at least somewhat radially expanded or compressed. Preferably, the retaining ring 68 has at its ends relief flat faces 72 to inhibit scuffing, scratching or marring of the workpiece 16. The retaining ring 68 may be as disclosed in U.S. Pat. No. 5,539,968. Alternatively, as shown in FIG. 4, the mounting ring 50 may comprise first and second halves 50*a,* 50*b* telescoped together with a split or circumferentially continuous ring 68 trapped between them.

To press a workpiece 16 such as a valve seat into a counterbore 18 of a body 20 such as an engine cylinder head, the valve seat is pushed or forced onto the mounting ring 50 causing its inner surface to be frictionally engaged by the split retaining ring 68. As the valve seat is further received on the mounting ring 50, its tapered inner surface further compresses the retaining ring 68 to increase the frictional engagement between them and thus more securely hold the valve seat on the press tool 12. Eventually, a generally planer end of the valve seat will engage the shoulder 62 of the outer surface of the mounting ring 50 to limit the insertion of the valve seat on the mounting ring 50. After the workpiece 16 is fully inserted onto the mounting ring 50, the press tool 12 is advanced towards the bore 18 of the body 20 to press fit the valve seat into the bore 18.

If the axis 56 of the press tool 12 is perfectly aligned or coaxial with the axis of the counterbore 18, the valve seat will be readily, coaxially press fit into the counterbore 18. If the axis 56 of the press tool 12 is somewhat inclined or skewed relative to the axis of the bore 18, the valve head will unevenly frictionally engage the bore 18 and thereby exert a force on the mounting ring 50 tending to rock, tilt or cant the mounting ring 50 relative to the press tool body 22 as controlled by the mating, complimentary end faces 54, 24 of the mounting ring 50 and press tool body 22. This canting or rocking movement of the mounting ring 50 relative to the press tool 12 permits the mounting ring 50 and hence, the valve seat, to be generally coaxially aligned with the bore 18 even when the press tool 12 is not coaxially aligned with the bore 18, and is in fact angularly inclined or offset relative to the axis of the bore 18. The extent of the tilting or canting of the mounting ring 50 is limited by the engagement of an inner surface 80 of the bore 52 through the mounting ring 50 and the shank 30. Preferably, the maximum extent of this tilting is limited to an included angle of 3° relative to the axis 56 of the press tool 12. Therefore, perfect alignment of the press tool 12 and bore 18 is not required with the workpiece holder according to the present invention to thereby greatly facilitate the assembly of valve seats, cup plugs, bushings and the like into corresponding counterbores or bores in various bodies. Even when the press tool 12 is angularly misaligned with the bore 18, a workpiece 16 may be firmly and completely inserted into and seated on the bottom shoulder of the counterbore 18 without damaging the workpiece 16 or the counterbore 18.

What is claimed is:

1. A press tool, comprising:

a press tool body configured to be carried by a press and having a first axis and an end face with a curved surface;

a mounting ring carried by the press tool body, having a curved surface complimentary to and slidably received on the curved surface of the end face of the press tool body, and the mounting ring being constructed and arranged to releasably retain a workpiece having a second axis to be press fit into a bore having a third axis such that by slidable movement of the mounting ring relative to the press tool body, the second axis of the workpiece may be angularly inclined to the first axis of the press tool body at an acute included angle to facilitate inserting the workpiece into the bore when the first axis of the press tool body is angularly inclined to the third axis of the bore.

2. The press tool of claim 1 wherein the curved surface of the end face of the press tool body is generally concave and the complimentary curved surface of the mounting ring is generally convex.

3. The press tool of claim 1 wherein the curved surface of the end face of the press tool body and the complimentary curved surface of the mounting ring are both inclined relative to a plane perpendicular to the first axis of the press tool body at an acute included angle of between 5 and 30 degrees.

4. The press tool of claim 3 wherein the curved surface of the end face of the press tool body and the complimentary curved surface of the mounting ring are inclined relative to a plane perpendicular to the first axis of the press tool body at an acute included angle of about 14 to 20 degrees.

5. The press tool of claim 1 wherein the mounting ring is generally annular.

6. The press tool of claim 5 which also comprises a shank carried by the press tool body and extending through the mounting ring, and a retaining member carried by the shank and at least partially overlying the mounting ring to retain the mounting ring on the press tool body.

7. The press tool of claim 6 wherein the outer diameter of the shank is less than the inner diameter of the mounting ring providing a circumferential gap between the mounting ring and shank.

8. The press tool of claim 1 wherein the mounting ring has a generally planar and generally annular shoulder constructed to engage a generally planar end of the workpiece received on the mounting ring.

9. The press tool of claim 6 wherein the retaining member is a washer attached to the shank with its periphery at least partially overlying the mounting ring and generally axially spaced from an underlying face of the mounting ring at least when the mounting ring is essentially coaxially aligned with the first axis of the press tool body.

10. The press tool of claim 9 which also comprises a biasing member carried by the press tool body and disposed between the washer and mounting ring to yieldably bias the mounting ring.

11. The press tool of claim 1 wherein the mounting ring has a generally circumferentially continuous outer surface which is tapered to facilitate receiving a workpiece having a tapered inner surface.

12. The press tool of claim 11 which also comprises a retaining ring carried by the mounting ring and wherein the outer surface of the mounting ring has a generally circumferential slot in which the retaining ring is received.

13. The press tool of claim 1 wherein the mounting ring comprises coaxial first and second ring halves forming a slot between them and a retaining ring received in the slot and carried by the mounting ring for frictional engagement with the workpiece received on the mounting ring.

* * * * *